June 19, 1962  C. M. BROWN ETAL  3,039,379
FOOD PRODUCT PROCESSING APPARATUS
Filed Nov. 18, 1958  3 Sheets-Sheet 1
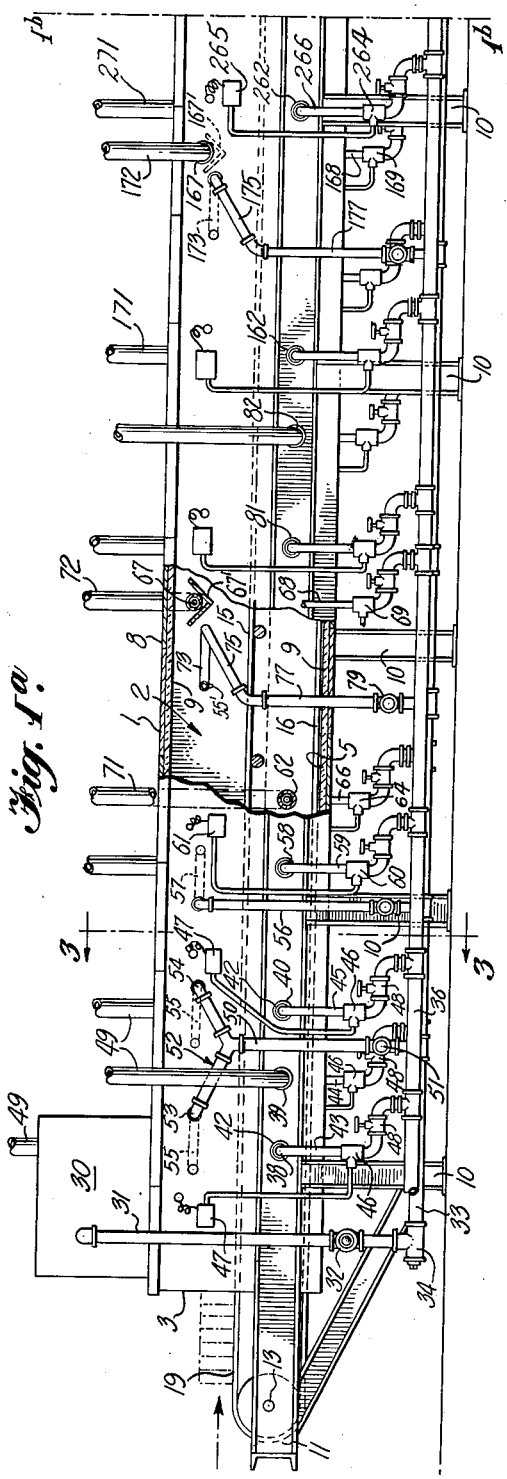
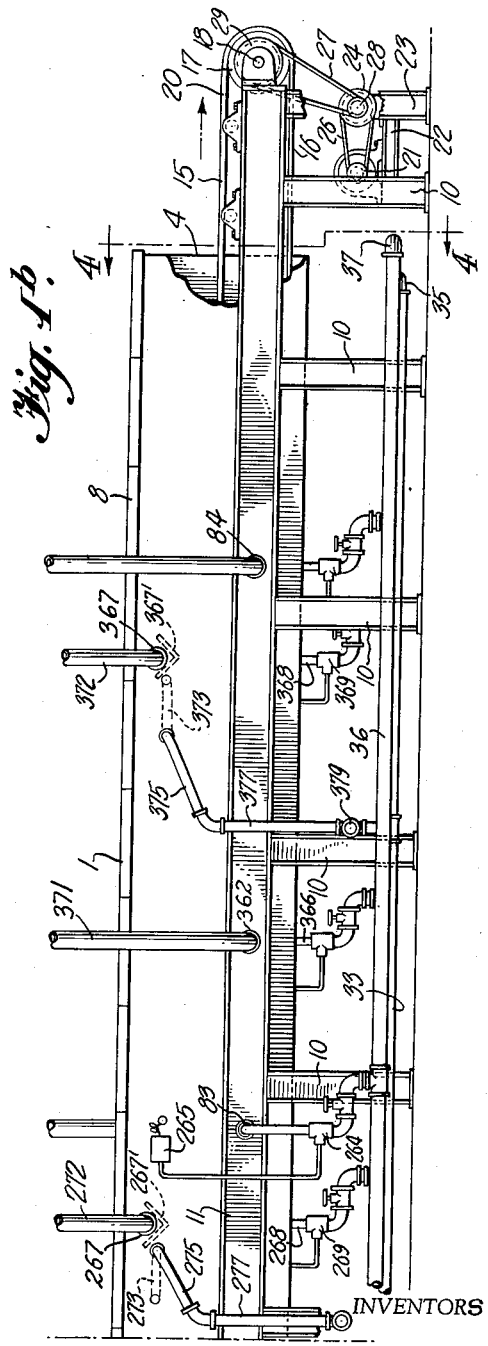
INVENTORS
Clarence M. Brown and
William Harry Vaughan
BY Mason, Fenwick & Lawrence
ATTORNEYS

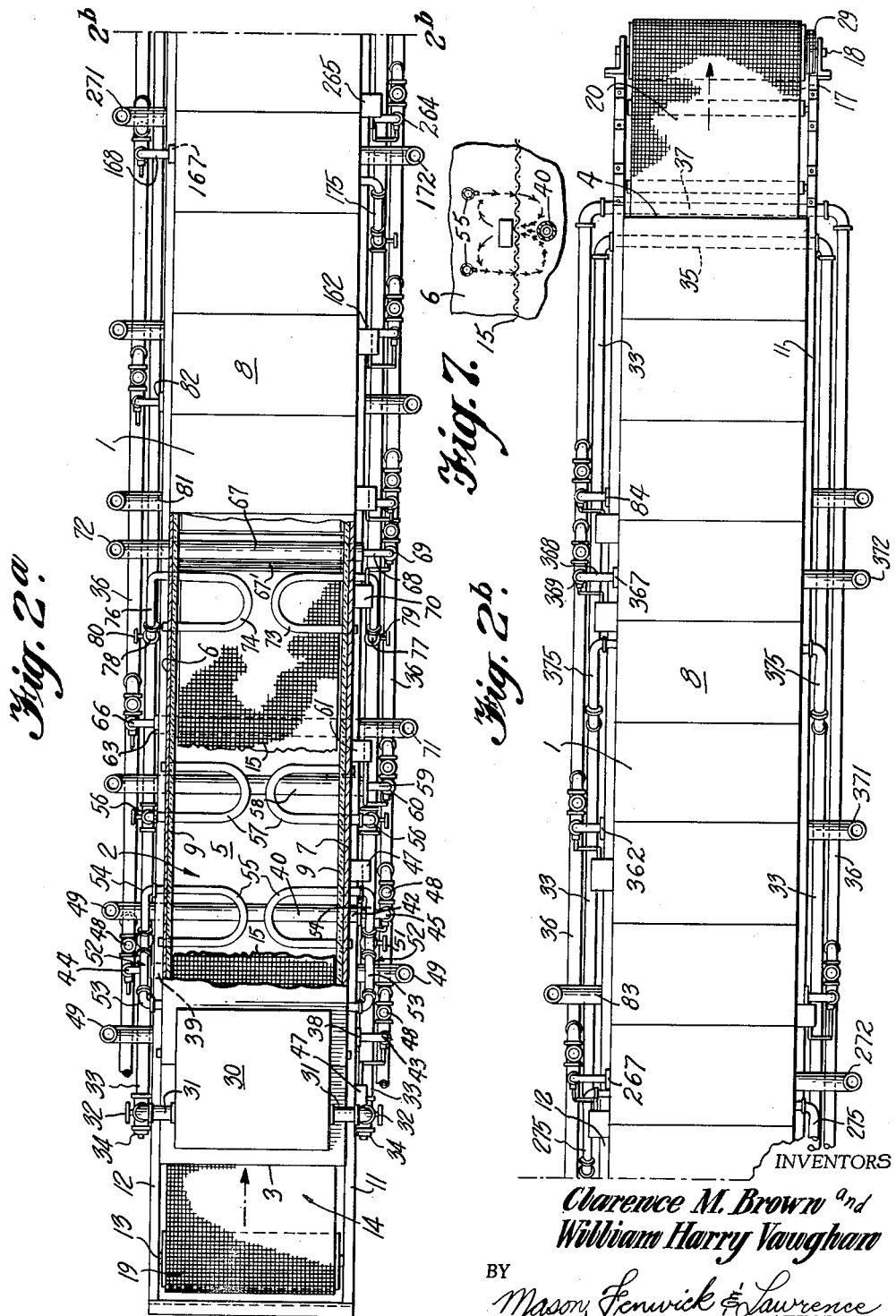

June 19, 1962 C. M. BROWN ETAL 3,039,379
FOOD PRODUCT PROCESSING APPARATUS
Filed Nov. 18, 1958 3 Sheets-Sheet 3
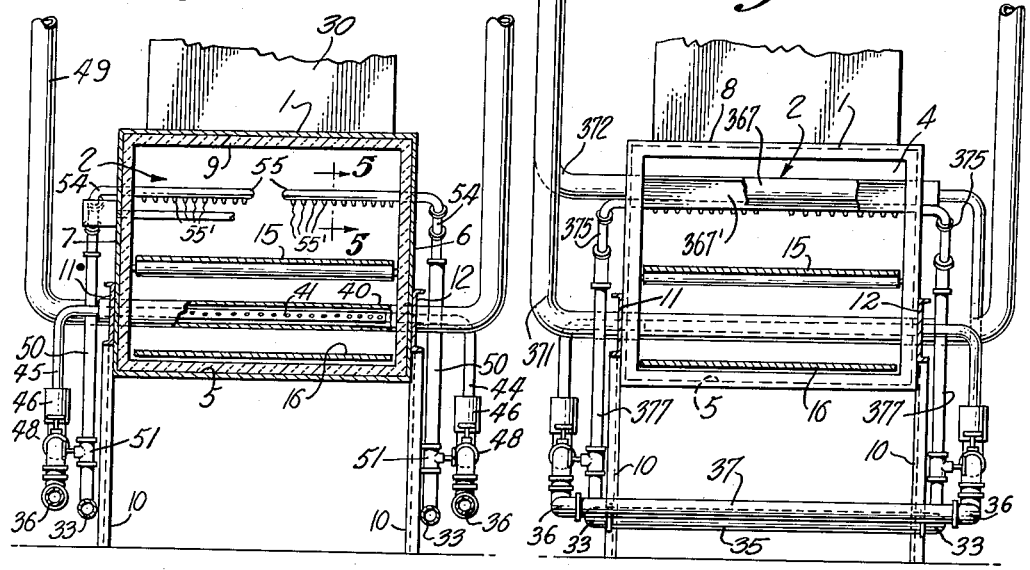
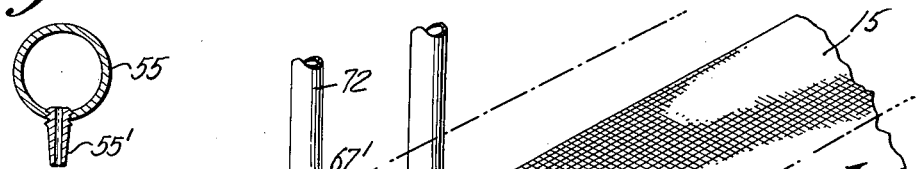
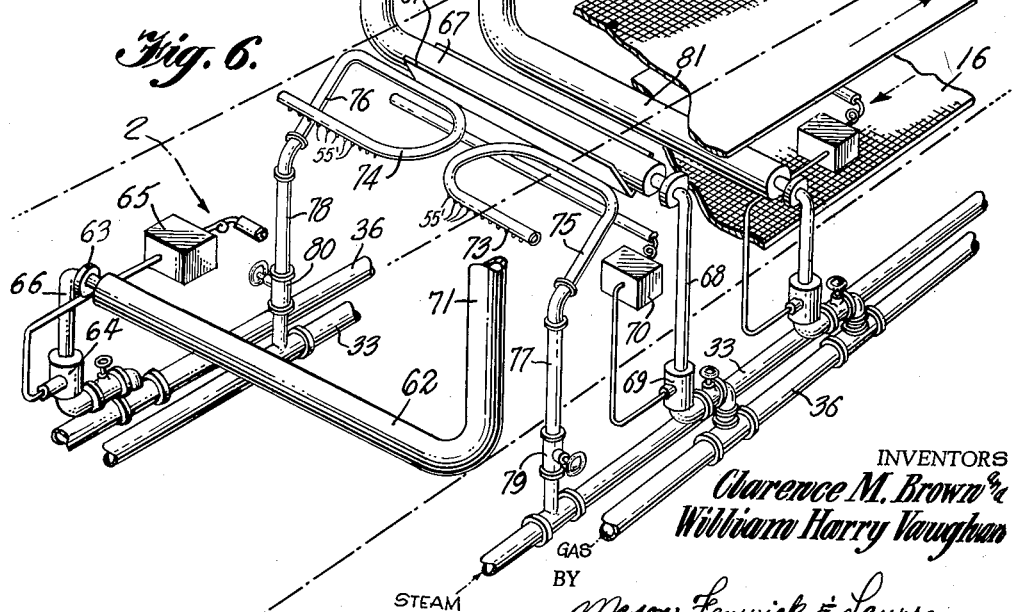
INVENTORS
Clarence M. Brown &
William Harry Vaughan
BY
Mason, Fenwick & Lawrence
ATTORNEYS United States Patent Office 3,039,379
Patented June 19, 1962

3,039,379
FOOD PRODUCT PROCESSING APPARATUS
Clarence M. Brown, Atlanta, and William H. Vaughan,
Macon, Ga., assignors to Armand May, Atlanta, Ga.
Filed Nov. 18, 1958, Ser. No. 774,699
5 Claims. (Cl. 99—362)

This invention relates to apparatus for heat treating food products and is particularly concerned with a continuously operable treatment apparatus for the cooking of successive containers of food products during the passage thereof through the apparatus. While the present inventive concept is broadly applicable to the treatment of a wide variety of food products supplied to the equipment in sealed or unsealed containers, the invention as here set forth is particularly adapted for the sterilization and processing of packaged food products delivered to the equipment in sealed containers.

In a large majority of the heat treatment processes for container packed food products, batches of the containers are subjected to cooking, sterilization, and like procedures in autoclaves, or pressure vessels, where they remain for a prescribed period of time under elevated temperatures and high pressure conditions. Obviously, the individual treatment of batches of such containers is a cumbersome and time consuming operation, and the equipment therefor is large, expensive, costly in operation, and requires the full time surveillance of trained operators. Efforts have heretofore been made to provide a continuously operating apparatus for subjecting successive containers of food to desired time and temperature conditions; however, difficulty has arisen with respect to the maintenance of appropriately graduated temperature conditions. These difficulties are particularly accentuated in the higher temperature ranges. It is, of course, desirable that the containers and their contents should be rapidly brought up to the desired treatment temperature, and that the temperature to which the the containers are subjected be gradually diminished so as to discharge the containers without injury thereto by sudden subjection to ambient temperature. Although steam has been proposed as the heating medium for continuous treatment apparatus, difficulty has been encountered in efforts to maintain a superheated steam environment throughout the required traverse of the food containers in the apparatus for the length of time required. Many devices, such as valves, curtains, etc. have been resorted to in order to achieve separation of the several different temperature areas needed, as heretofore it has not been possible to maintain these zones in an open tunnel. In addition, it has beem found necessary with previous devices to roll, tumble, or otherwise agitate the goods to get complete heat penetration.

The present invention seeks to avoid problems heretofore encountered by providing as a heating medium a combination of steam and the heat from a burner by which a regulated atmosphere of superheated steam may be maintained in motion. Means are provided by which the stem turbulence within the chamber is maintained in cyclic flow to insure a generally uniform temperature throughout any given vertical cross-section of the chamber, and to insure an appropriate contact of the steam with the heat generated by the burning fuel so as to maintain the steam in its super-heated condition.

A general object of the present invention is to provide a novel and improved tunnel-type continuous food treatment apparatus, the structural arrangement of which provides economy of construction and operation as well as maximum facility for automatic and continuous control of the temperature conditions therein.

It is also an object of the invention to provide apparatus for the treatment of food products wherein the food products are subjected to a controlled environment of superheated steam, the temperature of which may be maintained at varying degrees throughout the length of the device but uniform in any selected vertical section.

Another object of the present invention is to provide treatment apparatus by which successive food containers are successively subjected to a moving atmosphere of superheated steam, the temperature of which is automatically controlled to provide uniform zones of differing temperatures.

Another object of the present invention is to provide a simple, effective and efficient steam food treatment apparatus in which the temperature of the steam is maintained by reheating within the apparatus.

A further object of the invention is to provide treatment apparatus of the class described in which the heating medium can be a combination of superheated steam and the products of combustion of a gaseous fuel, the arrangement being such that the gaseous fuel is effective to maintain the superheated steam at predetermined temperatures.

More specifically, it is an object of the invention to provide a sterilization apparatus by which sealed containers are subjected to an initial high sterilization heat and by which the heat to which they are subjected is lowered as they move through the apparatus.

It is the ultimate object of the invention to provide apparatus for cooking, sterilizing, pasteurizing or other processing of foods and food products sealed in containers which will produce a processed product which is much brighter and more appealing in appearance than those processed in other apparatus and by other systems, and to accomplish this without sterilizing empty containers or lids, or the food product at another location, without the use of scalding hot water sprays or additional equipment for supplying additional superheated steam, without agitating the goods being processed, and without dividing the continuous tunnel into baffled off sections for pasteurizing, cooking and cooling.

Other objects of the invention will become apparent from the following description of one practical embodiment thereof when taken in conjunction with the drawings which accompany, and form part of, this specification.

In the drawings:

FIGURE 1a is a fragmentary side elevation, partly broken away, of the front, or entrance, end of apparatus embodying the present invention;

FIGURE 1b is a view, similar to FIGURE 1a, of the remainder of the apparatus;

FIGURE 2a is a top plan view of that portion of the apparatus shown in FIGURE 1a;

FIGURE 2b is a view similar to FIGURE 2a of the remaining apparatus;

FIGURE 3 is a vertical transverse section through the sterilization chamber of the apparatus, and is taken on the line 3—3 of FIGURE 1a;

FIGURE 4 is a similar view taken adjacent the exit end of the apparatus substantially on the line 4—4 of FIGURE 1b;

FIGURE 5 is a section through one of the steam pipes and a jet nozzle, taken on the line 5—5 of FIGURE 3;

FIGURE 6 is a fragmentary perspective view illustrating one of the superheated steam pipes and gas burner assemblies of the present apparatus; and, FIGURE 7 is a diagrammatic view of the steam coils and a heater assembly illustrating the cyclic flow of steam in the tunnel and about the product.

In general, the invention concerns apparatus including an elongated tunnel-like chamber, or compartment through which foods, or food products, in sealed containers are passed in continuous procession for processing. The processing is accomplished by providing within the tunnel longitudinally successive areas of different temperatures in each of which the air is in constant, vertical orbital movement to maintain a constant temperature in all parts of the area, and to maintain the air in the different areas separated.

Referring to the drawings in detail, there is shown a housing 1 which forms a continuous tunnel, or compartment, 2, having an open entrance end 3 and an open exit end 4. The tunnel is open from end to end. The tunnel may be of any preferred construction, and is shown as rectangular in cross-section and having a floor 5, side walls 6 and 7, and roof 8. The entire interior of the compartment is lined with insulation 9.

The housing 1 is supported upon legs 10, which are located at intervals along its length. Longitudinal beams 11 and 12 are secured along the sides of the housing and at the tops of legs 10. The beams extend the full length of the housing and project beyond the ends. At the entrance end of the housing, the projecting ends of the beams 11 and 12 carry a roller and shaft 13 about which is trained an open-mesh belt 14 having upper and lower flights 15 and 16. The belt runs the full length of the beams and, at the exit end 4 of the apparatus, is trained around a roller 17 mounted on a shaft 18 journaled in the projecting ends of the beams at the exit end. The belt will project beyond the entrance end of the housing to form a loading platform 19, and beyond the exit end to form a delivery platform 20.

Belt 14 is driven by means of a motor 21 (see FIGURE 1b) mounted upon a base 22 fixed to end legs 10 and base supporting legs 23. The motor is connected to a gear reducer 24 by a belt 26. The reducer is connected to roller shaft 18 at the exit end of the apparatus by a belt 27 which is trained around a pulley 28 on the roller shaft and a pulley 29 on the reducer.

It will be readily apparent from the above description and the drawings that the belt 14 is adapted to receive goods and transport them continuously through the chamber 2. The motor, or gear reducer, or both, are capable of speed adjustment so that the belt speed may be selected to provide the proper time interval within the chamber required by food products being processed.

It will of course be understood that the structural features of the mounting and support of the tunnel chamber 2 may be appropriately varied in accordance with the space and facilities available, and that in the practice of the invention the structure and arrangement may be modified to accommodate such facilities.

For the heat treatment of material passing through the tunnel chamber 2 on the conveyor flight 15, a thermostatically controlled superheater 30 is provided from which superheated steam is discharged downwardly through oppositely arranged vertical stand pipes 31 on each side of the chamber 2. Pipes 31 supply the superheated steam through a reducing valve 32 to horizontal steam feed lines 33 through interconnection by T fittings 34. As indicated, the superheater 30 is mounted above the chamber 2 at the entrance end of the apparatus, and the lines 33 extend along the side of the apparatus to the discharge end 4. In order to provide uniform distribution of the steam throughout the length of the apparatus, the lines 33 are interconnected at the delivery end of the apparatus by a transverse line 35 (see FIGURES 2b and 4). Parallel with the steam supply lines 33 on each side of the chamber there are gas fuel lines 36. In the same manner as the steam lines 33, the fuel lines 36 are joined at the discharge end of the chamber by cross pipe 37, so as to equalize gas pressure to the individual burners leading from the lines 36.

To insure a rapid rise in temperature of the contents of containers as they first enter the treatment chamber 2, steam delivery tubes and gas burners are more closely arranged at the entrance end, while greater spacing is provided toward the discharge end, the final discharge portion being free of heating means to permit cooling of the containers before their discharge into the surrounding low temperature environment. Therefore, adjacent the entrance end of the chamber there are disposed, between the conveyor flights 15 and 16 of the conveyor, equally spaced gaseous fuel burner units generally indicated by the numerals 38, 39 and 40. Each such unit is conventional and includes (see FIGURE 3) a straight transverse burner tube 41 which is connected at one end to a fuel-air, supply mixer 42, and is open at the other end to allow the waste products of combustion to be removed. Fuel is supplied to the mixers of units 38, 39 and 40 by fuel supply risers 43, 44 and 45, respectively (see FIGURE 1a), under the control of individual temperature responsive valves 46 controlled by thermal responsive units 47 (one for each burner) located in the upper area of the chamber above the individual burners. Manual valves 48 may also be provided for controlling the flow of fuel gas from the lines 36 to the risers. It will be noted that for the sake of simplicity and space in piping arrangement, the spaced fuel risers 43 and 45 extend upwardly from the right side of the chamber while the riser 44 of the intermediate unit 39 extends upwardly therebetween and parallel thereto from the opposite side of the chamber. A flue pipe 49 surrounds each burner tube 41 and terminates in a vertical flue so that products of combustion may be carried off and only radiant heat of the direct-fired tube is directed upwardly into the chamber.

In cooperation with the three burner units 38, 39 and 40, there is provided an upper steam discharge unit comprising a pair of opposed parallel steam supply risers 50, having manual valves 51, one on each side of the chamber, each extending upwardly from its associated supply line 33 between the fuel risers 43 and 45. At the upper end of each steam supply riser 50 a Y connection 52 is provided, connecting each riser 50 with upwardly inclined individual forward and rear steam feed pipes 53 and 54, respectively. As best illustrated by FIGURES 1a, 2a and 3, each feed pipe 53 and 54 of each side of the chamber is connected to a perforated horizontal steam delivery tube 55. Each tube extends transversely inwardly to a distance just short of the longitudinal center of the chamber where it turns and extends outwardly to form a U-shaped delivery arrangement. The perforations in the tube are fitted with carburetor jet nozzles 55' (see FIGURE 5). Each such arrangement leads from a separate steam pipe on an opposite side of the chamber, thus the steam temperatures and pressures will be equal and the distribution of steam in the upper end of the chamber will be uniform.

It will thus be seen that adjacent the entrance end of the chamber there is disposed a series of three burners located at the bottom of the chamber beneath the input conveyor flight 15, and thereabove, four parallel, half-width, U-shaped, steam delivery tubes. Since the Y connection 52 is midway between the pair of burner units 39 and 40, and since the steam delivery U-shaped tubes are connected by one leg and extend forwardly toward the entrance end of the housing, the assembly provides four longitudinally spaced transverse steam delivery tube legs for discharging steam downwardly and three burner units, one between and below each two of the steam tube legs. This arrangement of the burners below and between the steam tube legs provides a vertical, cyclic steam flow in the area since downwardly directed steam will be reheated to rise by convection (see FIGURE 7). Such circulation insures a virtually uniform turbulent heat medium, precluding cold areas or hot spots. The containers and the contents are thus quickly and evenly elevated in temperature, preferably to that of sterilization, during their initial travel through the chamber.

For maintaining this uniform high temperature as the receptacles further progress through the chamber, there is next provided in succession, and preferably as a continuation of equal spacing, a third pair of overhead U-shaped steam delivery arrangements supplied from a second successive pair of steam feed risers 56, one from each of the supply lines 33. In this instance, a U-shaped, perforated and jet fitted delivery tube 57 is connected to the riser (see FIGURES 1a and 2a). Beneath the conveyor flight 15, medially spaced between the horizontally spaced legs of the tube 57, there is provided a fourth burner unit 58 supplied by gas from a riser 59 under the control of a valve 60 responsive to a heat control unit 61. The spacing between the legs of tube 57 is preferably equal to that between the legs of tubes 55 while the burner 58 is spaced from burner 40 a distance equal to that between burners 38 and 40.

Next in succession, there is provided within the chamber 2 a steam delivery and burner assembly shown in FIGURES 1a and 2a and particularly in FIGURE 6, which includes a first lower burner 62, mixer 63 and automatic valve 64 controlled by the temperature responsive means 65. Gas is supplied to the burner from the supply line 36 on the left hand side of the apparatus through a riser 66. This burner is disposed between the belt flights 15 and 16 and next adjacent the burner 58 in spaced relation thereto. The assembly of FIGURE 6 also includes an upper burner 67 with a downwardly directed hood 67', the fuel being supplied by a riser 68, from the line 36 of the right side of the apparatus and controlled by a valve 69 under the influence of the temperature responsive means 70. The products of combustion from the burners 62 and 67 are exhausted through the flue pipes 71 and 72, respectively, on the opposite sides of the apparatus. Adjacent the upper burner 67, there is arranged an upper pair of U-shaped steam delivery tubes similar to those hereinbefore discussed. This includes a pair of U-shaped members 73 and 74 located in the upper portion of the chamber directly in advance and preferably parallel with the burner 67. The tubes are connected to downwardly inclined pipes 75 and 76, connected in turn to the risers 77 and 78 and under control of valves 79 and 80. By this arrangement, it will be seen that a readily controlled, partially independent zone is defined between the lower and upper burners 62 and 67 in which steam is delivered downawrdly adjacent the burner 62 from the upper pair of steam delivery tubes. The assembly just described comprises the lower burner 62 located between the belt flights, the upper burner 67 spaced longitudinally of the tunnel from burner 62, and the steam tubes 73 and 74 located at the height of the burner 67 and intermediate the burners 62 and 67. There are three duplicates of the above described assembly, making four such assemblies in all, arranged in spaced relation longitudinally of the tunnel, and the parts of the last three bear the same reference numerals as the one just described but increased by 100, 200 and 300, in accordance with their successive arrangement.

The first and second assemblies of this series are spaced apart, and intermediate lower burners, indicated generally by the numerals 81 and 82, are disposed therebetween beneath the conveying flight 15 of the conveyor. This arrangement provides for maintenance of general temperature conditions during travel of the containers for a period permitting absorption of the intense heat of the first of these assemblies. The next two successive assemblies of this type are mounted in direct succession with minimum spacing therebetween, and the last is spaced a substantial distance from the third with an intermediate lower burner 83 therebetween. A final lower burner is indicated at 84, being spaced inwardly a substantial distance from the outlet of the chamber so as to permit a reduction in temperature of the containers and their contents as they approach the outlet so as to minimize danger of injury due to a sudden decrease in the treating temperature to that of the ambient room conditions.

From the foregoing it will be seen that the present invention provides a continuously operable food treatment apparatus in which food products in sealed containers may be placed at the entrance of the apparatus and atuomatically conveyed therethrough in continuous succession. The material is rapidly brought to desired temperature by the upper steam pipes and the lower burners adjacent the entrance end of the apparatus and is thereafter subjected to the more intense heat of the units such as shown in FIGURE 6 where both steam and the gas burners create a high temperature zone for sterilization and cooking, which temperature is maintained throughout the major portion of the travel of the containers. It will also be seen that the heat is diminished toward the discharge end of the apparatus so that opportunity is provided for the cooling of the receptacles and their contents so that damage will be avoided when the receptacles emerge from the apparatus. In all of the temperature zones within the apparatus, the legs of the U-shaped steam delivery tubes lie in vertical transverse planes which are spaced on opposite sides of the vertical transverse planes of the burners. The downward flow of steam from the tubes and upwardly ascending heat from the burners in longitudinally spaced transverse planes will combine to create orbits of flow about the product on the conveyor, as shown diagramamtically in FIGURE 7. This will set up a cyclic flow between the steam tubes and burners wherein a closely controlled uniform heat is maintained. Due to the nature of flow, the controlled temperature remains in vertical transverse localized areas defined by the steam tube and burner assemblies so that the several temperature zones within the apparatus remain separated from one another without the need for curtains, doors, or other means to partition one zone from the next. Thus, the goods may move freely through the machine from one end to the other, while being subjected to heating, sterilization, cooking and cooling without interruption.

It will, of course, be understood that the invention is not limited nor confined to the specific structural arrangement or the grouping of the units here shown, and that in the practice of the invention numerous changes, modifications and the full use of equivalents may be resorted to without departure from the spirit or scope of the invention as defined by the appended claims.

What is claimed is:

1. Apparatus for processing food products comprising, a housing forming an elongated open-ended tunnel-type chamber, foraminous means to transport food products through the chamber from end to end in continuous procession, at least one steam tube mounted within the chamber, means for supplying steam to the steam tube, the steam tube extending transversely of the chamber in a horizontal plane above the foraminous transport means and having downwardly directed jets for directing steam downwardly through the foraminous transport means, and means within the chamber to reheat steam injected vertically downward into the chamber from the jets and create cyclic turbulence in a vertical orbital path longitudinally of and within the chamber comprising a radiant heater mounted within the chamber, the heater extending transversely of the chamber below the foraminous transport means and occupying a position offset longitudinally of the chamber relative to the steam tube and in the said orbital path.

2. Apparatus for processing food products comprising, a housing forming an elongated open-ended tunnel-type chamber, foraminous means to transport food products through the chamber from end to end in continuous procession, U-shaped steam tubes projecting into the chamber from opposite sides of the chamber above the foraminous transport means with the U-shaped tubes in end-to-end horizontal alignment, the U-shaped tubes having downwardly directed jets for directing steam downwardly through the foraminous transport means, and means within the chamber to reheat steam injected vertically downward into the chamber and create cyclic turbulence in vertical orbital paths longitudinally of and within the chamber comprising a radiant heater mounted within the chamber, the heater extending transversely of the chamber below the foraminous transport means and occupying a vertical plane intermediate the vertical planes of the legs of the U-shaped steam tubes in the said orbital path.

3. Apparatus for processing food products comprising, a housing forming an elongated tunnel-type chamber open from end to end, foraminous means to transport food products through the chamber from end to end in continuous procession, a series of processing assemblies within the chamber spaced longitudinally along the chamber, each assembly including at least one steam tube extending transversely of the chamber in a horizontal plane above the foraminous transport means and having downwardly directed jets for directing steam downwardly through said foraminous transport means, means for supplying steam to the steam tube, and means within the chamber to reheat steam injected vertically downward into the chamber from the jets and create cyclic turbulence within the chamber in a vertical, longitudinally extending orbital path, the steam reheating means of each assembly comprising a radiant heater mounted within the chamber below the foraminous transport means and extending transversely of the chamber, the heater occupying a position offset longitudinally of the chamber relative to the steam tube in the said orbital path, individual means to control the delivery of steam from each steam tube and the rate of heat of each heater, whereby the respective assemblies may be operated to produce areas of cyclic flow of different temperatures along the chamber and the cyclic flow in each area will maintain separation of the atmosphere of adjacent areas.

4. Apparatus for processing food products as claimed in claim 3 wherein the steam tubes of each assembly comprises a pair of U-shaped tubes in horizontal alignment transversely of the chamber, with the tubes of each pair terminating short of the transverse centerline of the chamber.

5. Apparatus for processing food products as claimed in claim 4 wherein the means for supplying steam to the steam tubes comprises a steam manifold having branch lines along each side of the housing with the U-shaped steam tubes being connected to the branch lines on the side of the housing in which the respective U-shaped tubes are located.

References Cited in the file of this patent

UNITED STATES PATENTS

| | | |
|---|---|---|
| 747,151 | Dixon | Dec. 15, 1903 |
| 843,893 | Hawkins | Feb. 12, 1907 |
| 1,231,594 | Fullard | July 3, 1917 |
| 1,307,744 | Magill | June 24, 1919 |
| 1,399,415 | Taliaferro | Dec. 6, 1921 |
| 1,491,958 | Logan et al. | Apr. 29, 1924 |
| 1,835,799 | Meyer | Dec. 8, 1931 |
| 2,035,746 | Hall | Mar. 31, 1936 |
| 2,124,010 | Smith et al. | July 19, 1938 |
| 2,205,182 | Whitten | June 18, 1940 |
| 2,253,920 | Vaughan | Aug. 26, 1941 |
| 2,255,540 | Dreffein | Sept. 9, 1941 |
| 2,295,273 | Thompson | Sept. 8, 1942 |
| 2,367,429 | Rauen | Jan. 16, 1945 |
| 2,607,698 | Martin | Aug. 19, 1952 |